United States Patent [19]

Imada et al.

[11] 4,391,497
[45] Jul. 5, 1983

[54] APERTURE STOP FOR MICROSCOPE CONDENSERS

[75] Inventors: Michio Imada, Kodaira; Masayuki Naito, Mitaka, both of Japan

[73] Assignee: Olympus Optical Co., Ltd., Tokyo, Japan

[21] Appl. No.: 211,949

[22] Filed: Dec. 1, 1980

[30] Foreign Application Priority Data

Dec. 7, 1979 [JP] Japan .......................... 54-168762[U]

[51] Int. Cl.³ .............................................. G02B 21/08
[52] U.S. Cl. .................................................. 350/523
[58] Field of Search ................. 350/87, 448, 449, 450, 350/252, 257, 17, 37, 38, 39, 319, 523

[56] References Cited

U.S. PATENT DOCUMENTS 2,727,435 12/1955 Ferrari .................................. 350/87
2,747,464 5/1956 Bowerman ............................ 350/87

Primary Examiner—Jon W. Henry
Attorney, Agent, or Firm—Cushman, Darby & Cushman

[57] ABSTRACT

An aperture stop for microscope condensers mounted to the lower part of a microscope condenser and comprising a fixed member and stop ring, the fixed member being provided with an index mark, the stop ring being provided with color marks of same colors as color bands provided to microscope objectives, the aperture stop being arranged that an aperture diameter corresponding to the numerical aperture of the objective to be used is obtained when one of the color marks having the same color as the color band of the objective to be used is set to the index mark, the aperture stop thus assuring simple and correct operation.

2 Claims, 5 Drawing Figures

APERTURE STOP FOR MICROSCOPE CONDENSERS

BACKGROUND OF THE INVENTION (a) Field of the Invention

The present invention relates to an aperture stop for microscope condensers and, more particularly, to an aperture stop for microscope condensers having improved indications.

(b) Description of the Prior Art

On the accompanying drawings, FIG. 1 shows a side view of a microscope in general. In FIG. 1, numeral 1 designates an arm, numeral 2 designates a condenser, numeral 3 designates an aperture stop accommodated in the lower portion of the condenser 2, numeral 4 designates a revolver, and numeral 5 designates an objective mounted to the revolver 4. When the objective to be used for observation by the above-mentioned microscope is exchanged by revolving the revolver 4, it is necessary to change the aperture diameter of the aperture stop according to the numerical aperture of the objective to be used. For this purpose, an objective is provided with various indications on its outer surface as shown in FIG. 2, i.e., an indication 5a which represents the kind of objective (achromat, apochromat, etc.), an indication 5b which represents the magnification, and an indication 5c which represents the numerical aperture. Besides, a colour band 5d representing the magnification is provided so that the observer can easily know the magnification of the objective by means of the colour of the colour band. The aperture stop 3 of the condenser 2 is provided with an index mark and graduations representing numerical apertures. The observer knows the numerical aperture of the objective to be used for observation by looking at the numerical aperture indication 5c, which is provided on the outer surface of that objective, and operates the stop ring so that the index mark of the aperture stop 3 comes to the position of the numerical aperture graduation which is equal to the numerical aperture of the objective. As, however, the numerical aperture indication 5c of the objective 5 is very small, it is considerably difficult to see it. Besides, when the objective 5 is mounted to the revolver 4, its numerical aperture indication 5c sometimes comes to the side opposite to the observer's side (comes to the right side in FIG. 1). In such case, the observer cannot see the indications other than the colour band 5d and, therefore, cannot know the numerical aperture of the objective.

SUMMARY OF THE INVENTION

It is, therefore, a primary object of the present invention to provide an aperture stop for microscope condensers in which an index mark is provided to a fixed member, and a stop ring is provided with colour marks of colours respectively same as the colours of colour bands provided to respective objectives, said aperture stop for microscope condensers being arranged so that the aperture diameter, which is suitable for the numerical aperture of the objective to be used, is obtained when the colour mark on the stop ring having the same colour as the colour of the colour band on the objective to be used is set to the index mark.

DETAILED DESCRIPTION OF THE PREFERRED EMBODIMENTS

Figure 1:
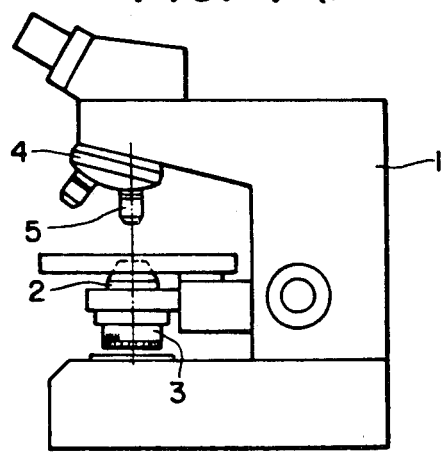
FIG. 1 shows a side view of an ordinary microscope.
Figure 2:
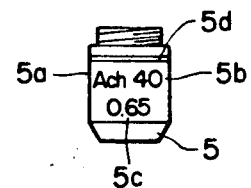
FIG. 2 shows a front view of an objective for the microscope shown in FIG. 1.
Figure 3:
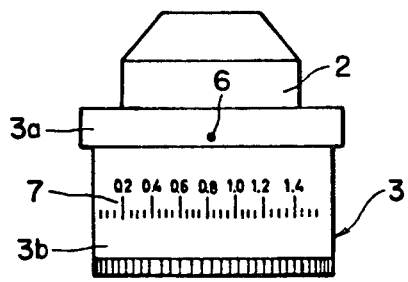
FIG. 3 shows a front view of an embodiment of the aperture stop for microscope condensers according to the present invention.
Figure 4:
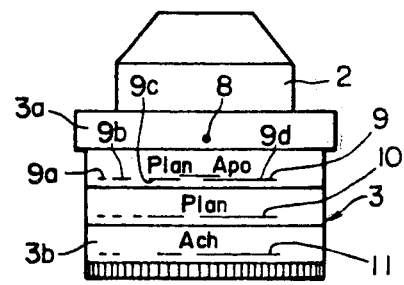
FIG. 4 shows a rear view of the above embodiment shown in FIG. 3.

In FIGS. 3 and 4 respectively showing a front view and rear view of an embodiment of the aperture stop for microscope condensers according to the present invention, numeral 6 designates an index mark provided at a predetermined position on a fixed member 3a of an aperture stop 3, numeral 7 designates numerical aperture graduations marked at a predetermined position on a stop ring 3b of the aperture stop 3, and these are the same as those of known aperture stops. Numeral 8 designates another index mark provided on the side opposite to the index mark 6. Numerals 9, 10 and 11 respectively designate three different colour marks provided on the side opposite to the numerical aperture graduations 7. These colour marks are classified according to the kinds of objectives, for example, the colour mark 9 is for a plan apochromat objective, the colour mark 10 is for a plan objective, and the colour mark 11 is for an achromat objective. Besides, each of the above colour marks is arranged as described below. For example, the colour mark 9 comprises portions 9a, 9b, 9c and 9d, and each of these portions is provided at the position just opposite to the position of the graduation value, out of numerical aperture graduations 7 of the stop ring 3b, which is equal to the numerical aperture of the objective belonging to the corresponding kind (plan apochromat) and having the corresponding magnification. Moreover, each of the above-mentioned portions 9a, 9b, 9c and 9d of the colour mark 9 is coloured in the same colour as the colour band provided to the corresponding objective and representing its magnification. Besides, each of the portions 9a, 9b, 9c and 9d has a predetermined length. Therefore, when the stop ring 3b is adjusted to the desired numerical aperture by using the above-mentioned colour marks, the aperture diameter of the aperture stop does not always correspond correctly to the numerical aperture of the objective to be used. However, even when the aperture diameter of the aperture stop does not correctly correspond to the numerical aperture of the objective to be used, it is not detrimental to observation as far as the aperture stop is adjusted to an aperture diameter within a certain range. It is rather better when the actual aperture diameter of the aperture stop is somewhat smaller than the aperture diameter corresponding to the numerical aperture of the objective to be used. For the colour marks 9, 10 and 11, those portions thereof representing the same magnification are not located at the same position but are located at positions slightly different from each other. This is because the numerical aperture becomes different when the objectives belong to different kinds even when those objectives have the same magnification.

The aperture stop for microscope condensers according to the present invention enables to adjust the aperture stop to the aperture diameter suitable for the numerical aperture of the objective to be used for observation when the observer looks at the kind indication 5a and magnification colour band 5d of the objective 5 to be used for observation and operates the stop ring 3b so that the index mark 8 coincides with the colour mark portion having the same colour as the magnification colour band 5d of that objective and constituting the colour mark 9, 10 or 11, which represents the same kind as the kind of that objective. At that time, the observer can carry out the above-mentioned operation even when he does not look at the numerical aperture indication 5c of the objective 5 and, therefore, he can adjust the aperture stop to the desired aperture diameter very quickly and correctly.

In the above-mentioned embodiment, two different combinations of indications are adopted, i.e., the combination of the index mark 6 and numerical aperture graduations 7 and combination of index mark 8 and colour marks 9, 10 and 11. However, only the combination of the index mark 8 and colour marks 9, 10 and 11 may be used as another embodiment of the present invention.

Figure 5:
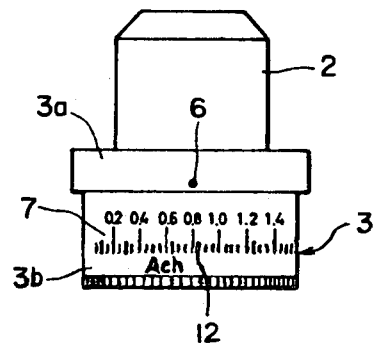
FIG. 5 shows a front view of another embodiment of the present invintion.

FIG. 5 shows still another embodiment of the present invention in which colour marks 12 respectively having the colours same as the magnification colour bands 5d of respective objectives are provided on the numerical aperture graduations 7 at the positions of those values which coincide with the numerical apertures of respective objectives. In case of this embodiment, it is also necessary to classify the positions of colour marks 12 according to the kinds of objectives. For this purpose, it is possible either to prepare a plural number of condensers according to the kinds of objectives so that each of those condensers is provided with the colour marks shown in FIG. 5 for the corresponding kind of objective or to provide the colour marks for all kinds of objectives to the aperture stop 3 of only one condenser.

As explained in the above, the aperture stop for microscope condensers according to the present invention has the advantage that it can be operated very quickly and reliably.

We claim:

1. A microscope assembly including a plurality of objectives of different magnification, a condensor, and an aperture stop mounted to a lower part of said microscope condensor and comprising a fixed member having an index mark on the outer surface thereof and having a rotatable stop ring, each of said plurality of objectives having a unique color marking thereon, each different from the other and indicative of the respective magnifications thereof, said rotatable stop ring of said aperture stop being provided with a plurality of unique color markings thereon equal in number to the number of the plurality of objectives and fixed in predetermined locations on said stop ring one of each of the unique color markings on said stop ring being identical in color marking to the unique color marking of one of the objectives, whereby when a particular objective having a particular unique color marking is in use, and said stop ring is positioned such that an identical one of said unique color markings on said stop ring is opposite the index mark, that the aperture diameter of said aperture stop corresponds to the numerical aperture of the particular objective in use.

2. A microscope assembly as in claim 1 wherein said objectives include objectives of different kinds, and wherein said rotatable stop ring is provided with separate sets of color markings, one set for each kind of objective.

* * * * *